United States Patent
Yang et al.

(10) Patent No.: US 10,326,543 B2
(45) Date of Patent: Jun. 18, 2019

(54) MODELLING INTERFERENCE

(71) Applicant: SIGNIFY HOLDING B.V., Eindhoven (NL)

(72) Inventors: Hongming Yang, Eindhoven (NL); Daniel Martin Goergen, Eindhoven (NL); Tim Corneel Wilhelmus Schenk, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 3 days.

(21) Appl. No.: 15/528,642

(22) PCT Filed: Oct. 27, 2015

(86) PCT No.: PCT/EP2015/074841
§ 371 (c)(1),
(2) Date: May 22, 2017

(87) PCT Pub. No.: WO2016/078877
PCT Pub. Date: May 26, 2016

(65) Prior Publication Data
US 2017/0272186 A1 Sep. 21, 2017

(30) Foreign Application Priority Data
Nov. 20, 2014 (EP) .................... 14193993

(51) Int. Cl.
*H04B 17/345* (2015.01)
*H04W 16/14* (2009.01)
*H04L 12/863* (2013.01)
*H04W 72/04* (2009.01)
*H04L 27/00* (2006.01)
(Continued)

(52) U.S. Cl.
CPC ....... *H04B 17/345* (2015.01); *H04L 47/6245* (2013.01); *H04W 16/14* (2013.01); *H04W 72/0446* (2013.01); *H04L 27/0006* (2013.01); *H04W 4/70* (2018.02); *H04W 72/085* (2013.01)

(58) Field of Classification Search
CPC . H04B 17/345; H04B 15/005; H04L 47/6245; H04W 16/14; H04W 72/0446
See application file for complete search history.

(56) References Cited

U.S. PATENT DOCUMENTS 8,964,718 B2 * 2/2015 Sadek ............. H04W 24/02 370/252
2008/0146156 A1 6/2008 Makhlouf et al.
(Continued)

*Primary Examiner* — Shukri Taha
(74) *Attorney, Agent, or Firm* — Akarsh P. Belagodu

(57) ABSTRACT

This disclosure relates to communicating on a wireless channel in the presence of an interference source. A receiver accesses the channel to perform a sequence of energy detections. The interference source is modelled as cyclically transitioning into and out of an inactive state and as cyclically transitioning, when out of the inactive state, between a first active state, in which the interference source is active and creating interference on the channel, and a second active state, in which the interference source is active but creating a substantially lower level of interference on the channel. Based on the sequence of energy detections, large and small time scale metrics are determined. Transmission of data by a transmitter is in dependence on the estimated metrics.

15 Claims, 9 Drawing Sheets

(51) Int. Cl.
*H04W 72/08* (2009.01)
*H04W 4/70* (2018.01)

(56) References Cited

U.S. PATENT DOCUMENTS

2013/0017794 A1    1/2013  Kloper et al.
2013/0035128 A1    2/2013  Chan et al.
2013/0176877 A1    7/2013  Sadek et al.
2016/0308627 A1*  10/2016  Park .................... H04B 1/1027

* cited by examiner

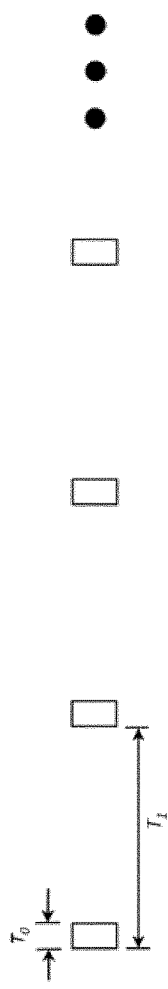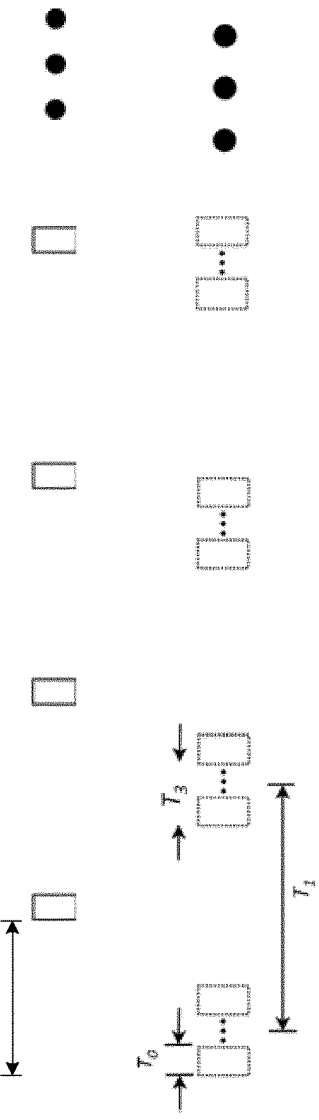

MODELLING INTERFERENCE

CROSS-REFERENCE TO PRIOR APPLICATIONS

This application is the U.S. National Phase application under 35 U.S.C. § 371 of International Application No. PCT/EP2015/074841, filed on Oct. 27, 2015, which claims the benefit of International Patent Application No. 14193993.4, filed on Nov. 20, 2014. These applications are hereby incorporated by reference herein.

TECHNICAL FIELD

This disclosure relates to modelling interference created by an interference source on a wireless channel, particularly but not exclusively a wireless channel in unlicensed spectrum.

BACKGROUND

Wireless communication devices communicate with one another by transmitting and receiving data to and from one another over wireless channels. A wireless channel may be an electromagnetic frequency, typically radio frequency (RF), or a set or narrow range of such frequencies. Signals transmitted on a wireless channel can be disrupted by interference on that channel. From the perspective of a given pair of devices transmitting and receiving signals to and from one another on a wireless channel, any other signals which disrupt those signals constitute interference. Interference can be created by other wireless communication devices communicating with one another on the same or a nearby channel, or by any other source of electromagnetic radiation which causes such disruption.

Since the advent of wireless radio communications, interference has always been an important issue to deal with to achieve reliable communications. For this reason, in many countries, a large portion of radio frequency bands are licensed and regulated by the relevant government. Any user needs to pay a premium to gain the access to the licensed bands.

In contrast, there also exist a few unlicensed bands, e.g. the industrial, scientific and medical (ISM) bands or the "whitespace" bands previously reserved in some countries for analogue television broadcasts, which are essentially free to use subject to certain regional regulations. In recent years, the use of un-licensed bands is becoming increasingly popular. One of the reasons is low cost. Another reason is that many applications, such as sensor network, wireless lighting control etc., do not need to transmit a lot of data continuously for a long interval of time.

With the increasing popularity and relatively weaker regulation in the unlicensed bands, interference in such bands is also becoming an important issue, exacerbated by the free access nature of unlicensed spectrum and the lack of stringent regulations.

There are mainly two types of interference that affect the radio communication performance. One is in-band interference, coming from all sorts of radio transmitters sharing the same band or transmitter leakage from out-of-band transmitters; the other is the leakage of out-of-band signal power captured by a receiver due to the receiver frontend filter being non-ideal in practice (out-of-band interference).

To deal with interferences, attempts may be made to detect and characterize the interferences so that appropriate strategies can be undertaken. One known type of approaches to try and deal with interference detection is to use an initial channel scanning operation. The initial scanning operation is performed to look for the available channels in the unlicensed bands. This initial channel scanning time is much longer than the typical packet duration. If this initial channel scanning reveals that there is no significant interference, the user starts to use this channel for the desired communication applications. In normal operations, listen-before-talk (LBT) type of approaches can be employed for short-term access of the channel.

There are two main drawbacks of this approach. One is that this approach cannot capture the potentially rapid-changing interference situations in a real-time manner. The other is the basic channel scan misses the important characteristics of the interference scenarios as well as the application relevance.

Specifically, often neither the desired application nor the interference sources require a constant occupancy of the channel, and often exhibit certain duty-cycle behaviours. For many applications in unlicensed spectrum, it is not required to transmit continuously a significant amount of data. Instead, many such applications only require certain burst transmissions, whether random or following a fixed schedule. Consequently, also due to the application characteristics of the potential users, the interference in many cases is not permanent and is of certain duty-cycle behaviours. As another example, in some applications such as RFID ("Radio Frequency Identification"), a frequency hopping scheme is used, instead of LBT.

Such frequency hopping also introduces a duty-cycle type of impact to a user, in the sense that the frequency hopper appears to be an interference source when it hops into the current user channel, and does not appear when it hops away from the current user channel (even though it is still active and may therefore may still be creating interference on other channel(s)).

Thus, the communication performance in the chosen channels cannot be guaranteed in many cases by the interference scanning approach because it cannot capture a fast-changing interference situation. Further, this approach also does not provide sufficient information to provide detailed network situation diagnosis.

US Patent application No. 2008/146156 discloses a method of predictive sensing of periodic intermittent interference which includes the measuring of energy on a channel for an indication of periodic intermittent interference. If a current energy level on the channel is below the new threshold and previous on energy characteristic suggests that the current energy level will remain below the new threshold for a predetermined minimum period of time, a clear channel indication is provided.

SUMMARY

In addition to the non-real time approaches to interference detection outlined above, there is another type of approach for trying to deal with interference detection and characterization which is highly real time. For the highly real-time approaches, such as that employed by TV whitespaces systems and other cognitive radio systems, a secondary communication device keeps checking the existence of a primary communication device. As soon as a primary communication device starts to use the radio spectrum, the nearby secondary communication devices need to react quickly and refrain themselves from transmitting any radio signal.

This real-time approach requires a high frequency monitoring of the radio spectrum, and the inventors have appreciated that it is overly and unnecessarily resource consuming for many applications, particularly low cost and low power applications such the wireless lighting control and sensor networks applications. From an application perspective, this approach also over shoots for the requirements of such applications.

This disclosure provides a pseudo-real time, application-relevant interference detection and characterization approach with an information output that is sufficiently rich for applications of the kind mentioned in the previous paragraph (unlike the non-real time approaches) but which is also low-cost to implement in terms of resource consumption (unlike the highly real-time approaches). That is, this disclosure provides interference detection and characterization which strikes a balance between information richness and resource consumption, and which is particularly though not exclusively suitable for applications of this kind.

According to a first aspect a device for communicating on a wireless channel in the presence of an interference source comprises an interface, a controller and a modelling component. The interface is configured to connect to a wireless transmitter and a wireless receiver. The controller is configured to control the receiver to access the channel to perform a sequence of energy detections, each energy detection comprising collecting energy in the channel at a respective detection time. The modelling component is configured to model the interference source as cyclically transitioning into and out of an inactive state and as cyclically transitioning, when out of the inactive state, between a first active state, in which the interference source is active and creating interference on the channel, and a second active state, in which the interference source is active but creating a substantially lower level of interference on the channel. Modelling the interference source comprises determining based on the sequence of energy detections: i) a large time scale metric which describes the transitioning into and out of the inactive state, and ii) a small time scale metric which describes the transitioning between the first and second active states. The controller is configured to effect transmission of data by the transmitter in dependence on the estimated metrics.

The inventors have appreciated that certain types of interference source, particularly those likely to be found creating interference in unlicensed spectrum in practice, exhibit a dual cyclic behaviour, for example dual periodic behaviour or at least behaviour that can be modelled as such reasonably accurately even if there is a random or pseudo-random element to the actual behaviour of the interference source. The first type of cyclic behaviour is the slower i.e. less frequent transitioning between the inactive state (when the interference source isn't creating any significant interference at all) and being active; the second type of cyclic behaviour is the faster i.e. more frequent transitioning between the first and second active states which occurs when and only when the interference source is active i.e. so that, even when the interference source is active, it is only actually creating significant interference on the wireless channel some of the time.

Moreover, the inventors have recognized that modelling this dual cyclic behaviour provides a characterization of the interference in the form of the two metrics which, for many applications, is sufficiently rich to enable useful communication to still take place notwithstanding the interference on the channel; advantageously, this modelling can be implemented using significantly fewer resources and at a lower cost than the highly real time approaches outlined above.

When there are multiple dominant interferers, the duty cycles are still usable, since in that case, the metrics will describe the aggregated large and small time scale behaviours of the interferers.

Note that "interference on a wireless channel" means any signals which disrupt transmissions to or from the wireless communication device on the wireless channel, which includes both in-band and out-of-band interference of the kind mentioned above.

The "substantially lower level of interference on the channel" in the second state means a tolerable level of interference on the channel which does not significantly disrupt to the operation of the device, as compared with an intolerable level of interference on the channel in the first state which does. This may be because the interference source is creating substantially no (i.e. no or negligible) interference on the channel, or because the level is non-zero but still low enough to be compensated for by e.g. error correction, interference mitigation etc. For example a frequency hopper may, when in a first active state, communicate on said wireless channel to create an intolerable level of interference from the perspective of the device, and when in the second active state communicate on a different channel(s) with potentially some in-band/out-of-band leakage onto said channel form the perspective of the device but at a tolerable level. As will be apparent, what constitutes tolerable/intolerable levels of interference is context dependent, and will depend in particular on the application of the device. For example, when the device forms part of a wireless lighting control network or sensor network, the substantially lower level is low enough to permit useful communication with other nodes in the network so as not to disrupt the device's lighting control or sensor function.

In a preferred embodiment, the data is transmitted as packets which are categorized as delay-sensitive or delay-insensitive; delay-sensitive packets are transmitted in dependence on the small time scale metric and delay-insensitive packets are transmitted in dependence on the large time scale metric. For delay-insensitive data packets, what matters is the average accessibility of the channel over a relatively long time scale as it is relatively unimportant when the delay-insensitive data packets arrives at their destination relative to one another as long as they all do so eventually (e.g. within say a 1 minute window, which gives plenty of leeway). In contrast, for delay-sensitive data packets, it is important to be able to guarantee that a given set of related delay-sensitive packets all arrive at more or less the same time (e.g. within milliseconds of on another); thus what matters is the short-term accessibility of the channel. Thus, the short and long time scale metrics are particular suitable for guiding the transmission of delay-sensitive and delay-sensitive data respectively.

The delay-insensitive packets may be transmitted in dependence on both the large time scale metric and the short time scale metric.

The large and small time scale metrics may convey the duty cycle of the transitioning into and out of the inactive state and the duty cycle of the transitioning between the first and second active states respectively.

The modelling component may be configured, for each energy detection in the sequence, to determine whether the amount of energy collected at the respective detection time is above a clear channel assessment threshold and to store an index of that energy detection only if so, the metrics determined based on the stored indexes.

The indexes for amounts which are above the clear channel assessment threshold may be inputted to a FIFO structure having a size M, whereby only the M most recent indexes above the clear channel assessment threshold are stored in the FIFO structure; the metrics may be determined based on the indexes stored in the FIFO structure.

The modelling component may be configured to implement a state machine, the state machine comprising: an inactive state corresponding to the inactive state of the interference source, a first active state corresponding to the first active state of the interference source, and a second active state corresponding to the second active state of the interference source; the state machine may be configured to transition between states in dependence on conditions pertaining to the plurality of energy measurements as follows:
  from the inactive state to the first active state when a first of said conditions is satisfied, satisfaction of the first condition indicating a transition by the interference source out of its inactive state,
  from the first inactive state to the second active state when a second of said conditions is satisfied, satisfaction of the second condition indicating a transition by the interference source into its second active state,
  from the second active state to the first inactive state when a third of said conditions is satisfied, satisfaction of the third condition indicating a transition by the interference source into its first active state,
  from the second active state to the inactive state when a fourth of said conditions is satisfied, satisfaction of the fourth condition indicating a transition by the interference source into its inactive state;
  the metrics may be estimated by tracking transitions of the state machine.

The first condition may be that M1 index(es) in the FIFO structure are within a first window, wherein the second condition is that at most m1 index(es) in the FIFO structure are within a second widow shorter than the first window, wherein the third condition is that at least m2 index(es) in FIFO are within the second window, and the fourth condition is that at most M2 index(es) in the FIFO structure are within a third window longer than the first window.

The device may comprise an interference power estimation component configured to estimate an average interference power, estimating the average interference power comprising summing a plurality of energy detection values, each obtained by an energy detection in the sequence for which a) the respective detection time coincides with the interference source being in the first or second active state and b) the amount of energy collected at the respective detection time is above a measurement threshold. The measurement threshold may be lower than the clear channel assessment threshold.

The sequence of energy detections may be performed according to a periodic schedule, wherein:
  each detection is performed at its scheduled time so that the sequence is periodic; or
  each energy detection performed at a time offset from its scheduled time by an amount selected at random from a predetermined time interval so that the sequence is pseudo-periodic.

The channel may be one of N wireless channels on which the device can communicate, and the controller may be configured to control the receiver to access each of the N channels to perform a respective sequence of energy detections based on the periodic schedule, the periodic schedule having a period T; the sequences may be interleaved with one another in time and each of the sequences is offset in time from a respective other of said sequences by T/N; the sequences may be used to model interference on the N channels.

The device may be configured for use in a wireless sensor network and/or a wireless lighting control network.

A second aspect provides a method for communicating on a wireless channel in the presence of an interference source. The method comprises the following steps. A receiver is controlled to access the channel to perform a sequence of energy detections, each energy detection comprising collecting energy in the channel at a respective detection time. The interference source is modelled as cyclically transitioning into and out of an inactive state and as cyclically transitioning, when out of the inactive state, between a first active state, in which the interference source is active and creating interference on the channel, and a second active state, in which the interference source is active but creating a substantially lower level of interference on the channel. Modelling the interference source comprises determining based on the sequence of energy detections: i) a large time scale metric which describes the transitioning into and out of the inactive state, and ii) a small time scale metric which describes the transitioning between the first and second active states. Transmission of data by a transmitter is effected in dependence on the estimated metrics.

According to a third aspect a computer program product comprises code stored on a computer readable storage medium and configured when executed to implement the method of the third aspect.

BRIEF DESCRIPTION OF FIGURES

FIG. 2A schematically illustrates a sequence of periodical energy detections for one wireless channel;

FIG. 2B schematically illustrates a sequence of periodical energy detections for multiple wireless channels;

FIG. 2C schematically illustrates a sequence of pseudo-periodical energy detections for one wireless channel;

DETAILED DESCRIPTION

Figure 1A:
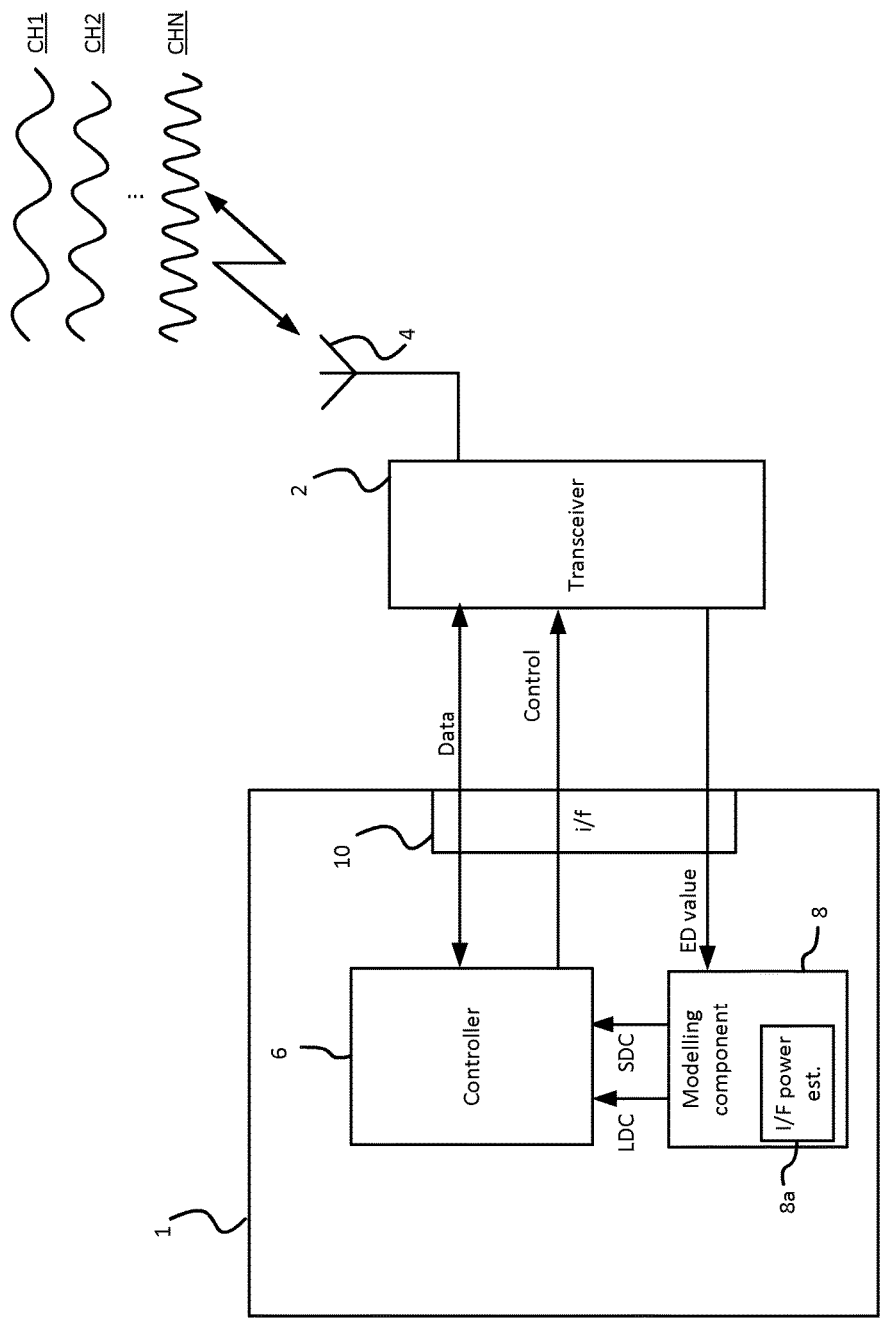
FIG. 1A shows a schematic block diagram of a wireless communication device.

FIG. 1A shows a block diagram of a wireless communication device 1, which comprises a controller 6, a modelling component 8 and an interface 10. The controller 6 and modelling component 8 represent functionality which may be implemented in hardware circuitry, as code executed on a suitable processor or a combination of both. The controller 6 and modelling component 8 are connected via the interface 10 to a radio transceiver 2, which is itself connected to an antenna 4. The transceiver 2 may be integrated in the device 1, in which case the interface 10 is internal to the device, or it may be non-integrated e.g. it may be part of an external modem connectable to the device 1, in which case the interface 10 is external (e.g. a USB or serial port interface).

The transceiver 2 is both a wireless transmitter and a wireless receiver. The controller 6 provides data to (resp. receives data from) the transceiver 2 to be transmitted (resp. which has been received) as RF signals via the antenna 4. The controller 6 can control the operation of the transceiver 2 by supplying control signals thereto. In particular, the controller 2 can control the transceiver 2 to perform an energy detection (energy measurement) at a desired time. The energy detection comprising collecting energy in the channel at the desired time over a short duration T0. The results of the energy detection are communicated from the transceiver to the modelling component 8 as obtain an energy detection (ED) value, which is indicative of the amount of energy collected. The modelling component 8 has a first and second output connected to a first and second input of the controller 6 respectively, by which interference-related metrics LDC, SDC estimated from ED values collected over time are supplied to the controller 6. This is described in detail below.

The device 1 may be a sensor device (i.e. incorporating sensor functionality) and/or a lighting control device (i.e. incorporating lighting control functionality).

To implement sensor functionality, the controller 6 is connected to and configured to interact with a sensor (e.g. a photosensor). The controller 6 receives sensor data from the sensor (e.g. a current light level), which the controller passes to the transceiver 2 for transmission; the transceiver 2 may also receive control data via the antenna 4 which is passed to the controller 6, based on which the controller 6 controls the operation of the sensor.

To implement lighting control functionality, the controller 6 is connected to and configured to interact with a luminaire. The luminaire comprises a lighting element (e.g. an LED, array of LEDs, filament bulb or gas discharge lamp), the light output of which is controllable by the controller 6, e.g. to change the luminous flux and/or colour balance of the lighting element, based on lighting control data received via the antenna 4.

Data can be transmitted and received on one of N>1 wireless channels CH1, CH2, . . . , CHN. In this example, each channel is a carrier at a particular frequency in an unlicensed RF spectrum (e.g. ISM or whitespace), and data is transmitted on that channel by modulating the data onto that carrier using frequency or amplitude modulation. Data is transmitted and received in the form of discrete packets.

Figure 1B:
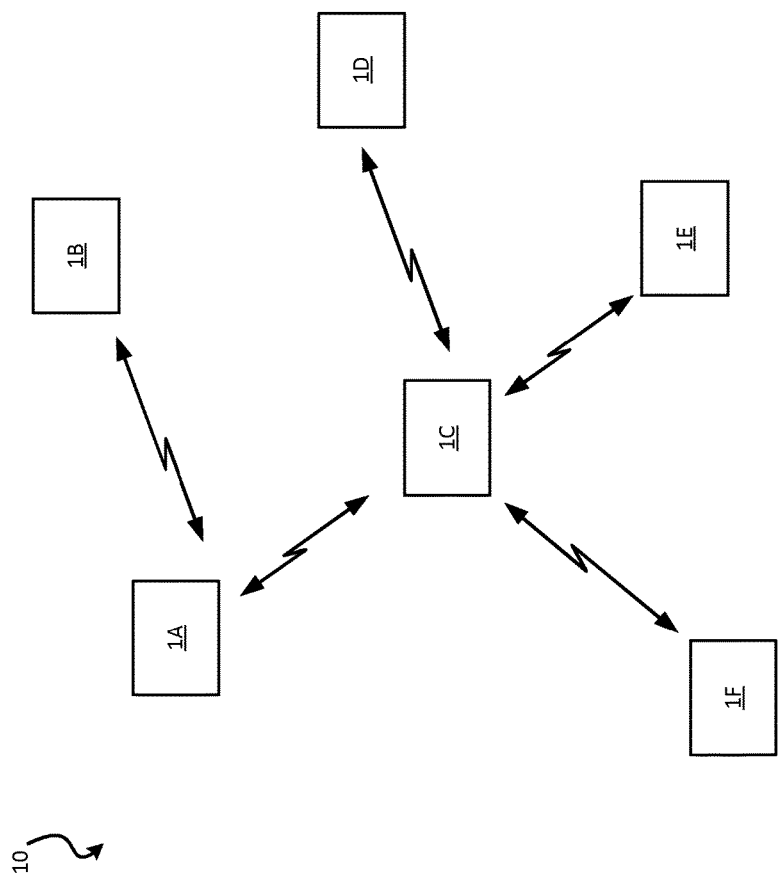
FIG. 1B shows a schematic diagram of a wireless network of multiple wireless communication devices.

FIG. 1B shows a wireless network, which is a radio communication network 10 comprising multiple such wireless communication devices 1A, . . . , 1F. The devices 1A, . . . , 1F are nodes of the network 10. The network 10 has a mesh architecture in that data (e.g. sensor data and/or lighting control data etc.) is transmitted wirelessly through the network by the nodes 1 acting as relays for other nodes 1 rather than through dedicated routers, wireless access points etc. The network 10 may for instance operate in accordance with ZigBee protocols.

The nodes 1A, . . . , 1F could for instance be sensor devices, lighting control devices, or a combination of both. For example, sensor nodes could collect data on current light levels which is used to control the light output of luminaires controlled by lighting control nodes to automatically adapt the overall light output to compensate for changes in the ambient natural light levels throughout the day.

From the perspective of any pair of communicating nodes 1 in the network 10 on a particular wireless channel, transmissions by other nodes 1 in the network 10 which disrupt the communication on that channel constitute interference, as do signals originating outside of the network 10 e.g. from other wireless networks operating in the same or similar spectrum. This includes in-band and out-of-band signals which disrupt communication on that channel.

Hereinbelow is presented a method of pseudo real-time duty-cycle radio interference characterization. The method is implemented by the modelling component 8 of each node 1 in the network 10.

As indicated, the widely-used standard existing interference scanning approaches:
- miss the important characteristics of interference scenarios as well as the application relevance. Specifically, many desired applications and types of interference sources do not require a constant occupancy of a channel, but rather are often of certain duty-cycle behaviours;
- either do not capture the potentially rapid-changing interference situations in a real-time manner, or are too resource consuming while offering highly real-time interference detection beyond the application interest of many practical applications such as sensor network, wireless lighting control, etc.

In contrast, the method presented hereinbelow is balanced based on the requirements of low cost and low power applications, such as lighting control and sensor network applications. The behaviours of the interference are characterized statistically over time based on a sequence (or sequences) of energy detection samples. An aggregation of the sequence/sequences of channel assessments is used to classify an interference scenario in terms of:
  i) a large-scale duty cycle (LDC), capturing the state of an interference source being active or inactive; and
  ii) a small-scale duty cycle (SDC), capturing the intermitted patterns of the interference source when active.

This duty-cycle characterization is performed in a fixed and limited time interval, i.e. in a pseudo-real time manner.

In order to obtain the sequence of channel assessments, a real-time channel scanning approach is used, which is based on regular (periodic, randomized pseudo-periodic, adaptive-periodic) but short channel assessments with energy measurements which are executed between normal transceiver operations or when no other transceiver operations are performed.

Returning to FIG. 1A, the radio transceiver 1 has two normal active operation modes: transmit mode and receive mode. In the receive mode, the transceiver 2 also has two sub-modes: listening mode, when the transceiver 2 awaits a valid packet, and the packet-reception mode, when a packet header has been detected in the channel and the packet is being received. On top of these normal operation modes, a channel scanning, which is also called "energy detection" (ED), operation involves switching the radio transceiver 2 to a receive mode, and then collecting signal energy in a particular channel (one of CH1, CH2, . . . , CHN) for a short duration of time T0 to obtain an ED value which is indicative of the amount of energy which has been collected over the duration T0. During this process, the transceiver cannot transmit or receive any normal packet.

FIG. 2A illustrates a periodical energy detection schedule for a single channel. An energy detection is performed at every interval T1, which is significantly larger than the actual energy detection time T0. The periodical energy detection schedule is illustrated in FIG. 2. A practical example of the values of T0 and T1 is T0=320 µs and T1=100 ms—it will be appreciated that these are exemplary values for the purpose of illustration. Because T1>>T0, the impact of the energy detection on the normal transceiver operation is minimal.

FIG. 2B illustrates a periodical energy detection schedule for multiple channels CH1, CH2, . . . , CHN. In the presence of multiple possible channels to be used, energy detection schedules are interleaved among the multiple channels CH1, CH2, . . . , CHN such that energy detection operations are maximally separated in time. Specifically, assuming there are in total N channels, the time interval between the energy detection operation in two channels is T2=T1/N (so for channel n, Tn=(n−1)*T1/N—note the numbering of channels is arbitrary).

As a practical variation of the periodical energy detection, a pseudo-periodical energy detection schedule (illustrated in FIG. 2C) can be employed, in which a random jitter is introduced for each of the energy detection operation as illustrated. Specifically in such pseudo-periodical operation, the starting time of each energy detection operation is chosen randomly within a T3 interval, around the scheduled time. Similarly, such pseudo-periodical, or jitter, scheme can be extended into the case of multiple channels (effectively a combination of the schemes of FIGS. 2B and 2C).

With the results obtained from the (pseudo-)periodical energy detection operations, an interference situation can be characterized in the or each channel. As indicated, the interference situation(s) is characterized considering the impact to the data communication applications.

Most of data communication applications running in the unlicensed spectrum have a random or burst type of data pattern, instead of a continuous pattern. Further, the data can be divided into two types: delay-insensitive and delay-sensitive.

For delay-insensitive data, a relatively large delay is tolerable for each individual packet from a transmitter to reach a receiver. What is important for this type of application is that in total a number of data packets are received within certain time. For instance, 10 packets might be expected to be received in one minute successfully, but it may not matter whether the 10 packets are received in the beginning, in the end, or randomly distributed within the one-minute interval.

For the delay-sensitive data it is important to guarantee that each packet is received within a relatively short interval. For instance, for lighting applications, it is important to be able to switch on all the lamps in an emergency situation. For such application, it is important to know the average accessibility of the channel in a small time scale ("small scale").

For such delay-insensitive data transmission, it is important to know the average accessibility of the channel in a large time scale ("large scale"), though small scale changes can also be relevant in particular when the large scale duty cycle is high (in which case the limiting factor becomes the small scale behaviour. In practice, the product of the large-scale duty cycle and the small-scale duty cycle (i.e. SDC*LDC) can be applied for delay insensitive applications so as to capture both the large and small scale behaviours in a single metric SDC*LDC.

Note that the "large time scale" and "small time scale" are relative terms and the precise definition is dependent on specific application requirements. Nevertheless, for a typical situation, the large time scale interval is expected to be several orders of magnitude larger than the small time scale interval.

To this end, the modelling component 8 implements an interference characterization method to model the interference source as i) cyclically transitioning, relatively slowly, into and out of an inactive state i.e. between active and inactive and ii) as cyclically transitioning, relatively fast and only when active, between a first active state, in which the interference source is active and creating interference on a channel in question, and a second active state, in which the interference source is active but is not creating interference on the channel in question. The interference source is thus modelled as always being in one of three discrete states: inactive, first active and second active.

The interference characterization method has two outputs, generated based on the ED values collected over time: an estimated large-scale duty cycle (LDC), which is an estimate of the duty cycle of the switching of the interference source between active and inactive (i.e. the average amount of time for which the interference source is active as a proportion of total time) and an estimated small-scale duty cycle (SDC), which is an estimate of the duty cycle of the switching of the interference source, when active, between 'active and creating interference on the channel in question' and 'active but not creating interference on the channel in question' (i.e. the average amount time for which the interference source is active and creating interference on the channel in question as a proportion of the average time for which it is active).

Delay-insensitive packets are transmitted in dependence on the large time scale metric (which need not take into account the small time scale metric), and delay-sensitive packets are transmitted in dependence on the small time scale metric (which need not take into account the large time scale metric).

There are a number of different ways to use these duty cycles, for instance, as the criteria for switching the communication channel of the entire network. As another specific example, data-extensive and/or critical application traffic, such as the update of light switching schedule, may be avoided in time intervals with serious network interference situations.

The actual behaviour of the interference source may be (at least approximately) periodic i.e. transitioning (approximately) periodically between active and inactive with period P1, and between the first and second active states with period P2<P1 so that LDC represents the proportion of P1 for which the interference source is active, and SCD represents the proportion of P2 for which the interference source is active and creating interference on the channel in question. This is not necessary however—for instance, the transitioning between the first and second active states may be random or pseudo-random in nature, but nonetheless such that that the probability of the interference source being active and creating on the channel in question at a given point in time remains reasonably constant; in this case, the SDC still provides a good overview of the average short time scale behaviour of the interference source.

Figure 3:
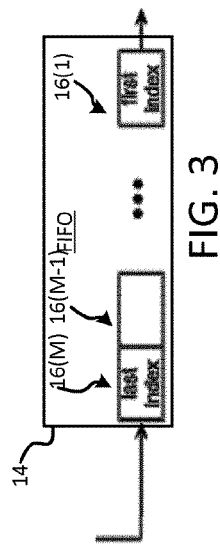
FIG. 3 schematically illustrates a FIFO structure implemented by a modelling component.
Figure 4:
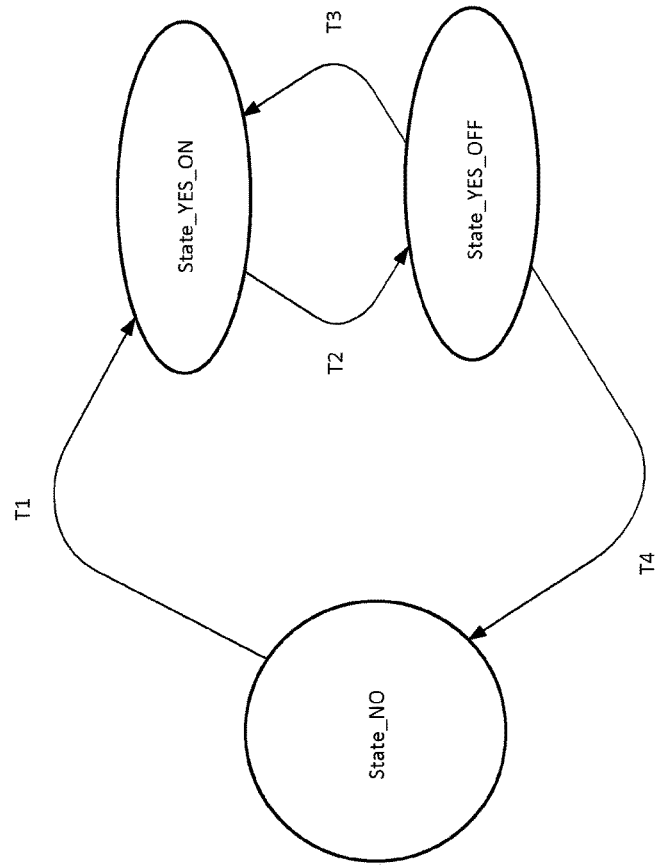
FIG. 4 shows a state machine for an interference modelling method.

With reference to FIGS. 3 and 4, one such method will be described, which is low-complexity and requires minor memory usage and computational power.

A key element in this approach is that the energy detection samples are indexed (i.e. a sequence of measurements is performed, and each energy measurement in the sequence is represented by an index corresponding to the position of that energy measurement in the sequence) instead of storing all the samples. A counter starts when the interference characterization process is started or reset, and is incremented at each energy detection; the index assigned to the current measurement is based on the current value of the counter. Since the energy detections are undertaken in a regular manner, from duty-cycle estimation point of view, it is sufficient to focus on the number of samples beyond certain threshold values. This threshold value can be chosen based on communication link budget analysis. A link budget analysis is an analysis of the various gains, losses and fading that apply to the communication signals from a transmitter to a receiver. For instance, the threshold value may be determined based on the expected received signal power at a receiver and the desired signal-to-noise ratio for a successful signal reception.

It is not necessary to record all the indexes; here, only the indexes when the energy detection values are beyond the chosen threshold are recorded. Further, not all such the indexes with high energy detection values need be stored; only a number of most recent such indexes are of interest, as will be detailed later from a state-machine perspective. A FIFO ("first-in first-out") structure is employed to store the indexes of the relevant energy detection values.

FIG. 3 illustrates a FIFO structure 14, in which M indexes 16(1), . . . , 16(M) (generally referenced as 16) are held. If an ED value is beyond a clear channel assessment (CCA) threshold (e.g. which may be set manually based on the link budget analysis for the specific communication systems), then the index of the ED operation is input to the FIFO 14. The CCA threshold defines a boundary between what is considered to be a tolerable level of interference in the channel (below the threshold) not significantly detrimental to normal operation of the device 1, and an intolerable level of interference on the channel (above the threshold) which is.

The FIFO thus holds the M (e.g. M=10) most recent indexes, with the oldest index ("first index" 16(1)) being dropped when a new index is added once the FIFO is full ("last index" 16(M) being the most recent index). The CCA threshold represents the boundary between the channel being clear for use (below the threshold), and the interference level on the channel being too high channel being unusable due to too high a level of interference on the channel (above the threshold). Where multiple channels are monitored contemporaneously (as in FIG. 2B), multiple such FIFOs are implemented and updated independently of one another—one for each channel.

Note that the reference numerals 16(1), . . . , 16(M) relate to positions in the FIFO: as the FIFO 14 is updated, each index 16(n) changes i.e. when a new index is added, this new index becomes the last index 16(M), what was previously the last index 16(M) becomes the second to last index 16(M−1) etc. What was the first index is dropped from the FIFO, and what was the second index becomes the first index.

FIG. 4 shows a state machine 20 useable for interference characterization on a current channel, which is run with regard to the interference detection values. The state machine 20 has three states: State_NO, State_YES_ON and State_YES_OFF. The State_NO corresponds to a state of an interference source, in which it is assumed that the interference source is non-existing or its power is switched off (i.e. is inactive). This state is most useful from large-scale duty cycle estimation perspective.

The State_YES_ON corresponds to a state of the interference source, in which it is assumed that the interference source is being operated (i.e. is active) and is generating interferences to the current channel. The State_YES_OFF corresponds to a state of the interference source, in which it is assumed that the interference sources is being operated (i.e. is active), but not generating interferences to the current channel right now.

An example is a potential interference source in the form of a frequency hopper. State_NO means that the frequency hopper is switched off. State_YES_ON means that the frequency hopper is switched on and currently transmitting into the current channel. State_YES_OFF means that the frequency hopper is switched on but currently has hopped away from the current channel.

The state machine 20 is updated for each energy detection operation, regardless whether the index of the energy detection result of that operation is taken into the FIFO (i.e. regardless of whether or not the ED value is above or below the CCA threshold). Below and in FIG. 4, "current_index" means the index of the most recent ED operation, the result of which may or may not have been added to the FIFO 14.

In terms of transition criteria between multiple states, what is employed is the most recent probabilities that an energy detection value exceeds the chosen threshold by using the indexes stored in the FIFO. The transition criteria are as set out below (Tn:X->Y means a transition from state X to state Y; the notation "Cn" is used to represent the condition under which that transition Tn occurs).

Four sets of recorded times are maintained, and updated when the state machine 20 undergoes a transition in the manner set out below. It is these time variables which are used to estimate the duty cycles SDC and LDC, which will be described in due course.

Three parameters $\tau 1$, $\tau 2$ and $\tau 3$ parameterize the behaviour of the state machine 20. The values of these parameters are set in a pragmatic manner based on the available memory for the FIFO and the percentage criteria that are used in these transition conditions.

T1: State_NO->State_YES_ON:
  C1: if M1 indexes (e.g. M1=M i.e. if all M indexes 16) in the FIFO 14 are within are the window [current_index-$\tau 1$, current_index] (e.g. $\tau 1$=100);
  Record new t1=the first index 16(1) currently in the FIFO 14;
  Record new t2'=t1 (i.e. also equal to the first index).
T2: State_YES_ON->State_YES_OFF:
  C2: if at most m1 index(es) in the FIFO 14 is (are) within the window [current_index-$\tau 2$, current_index], where $\tau 2 < \tau 1$ (e.g. $\tau 2$=10, m1=1);
  Record new t1'=the last index 16(M) currently in the FIFO 14;
T3: State_YES_OFF->State_YES_ON:
  C3: if at least m2 indexes in the FIFO 14 are within [current_index-$\tau 2$, current_index], (e.g. m2=2);
  Record new t2'=the earliest index currently within [current_index-$\tau 2$, current_index].
T4: State_YES_OFF->State_NO:
  C4: if at most M2 indexes in the FIFO 14 are within the window [current_index-$\tau 3$, current_index] where $\tau 3 \geq \tau 1$ (e.g. $\tau 3$=1000, M2=M−1, for instance M2=9);
  Record new t2=the first index 16(1) currently in the FIFO 14.

Broadly speaking, the scheme set out above works as follows. Recall that the FIFO 14 holds only indexes for ED values above the CCA threshold: so all the currently held indexes being within $\tau 1$ of current_index (i.e. condition C1 being satisfied) means there has recently been a relatively sustained high energy level on the channel, which can be assumed to have commenced at a time corresponding to the first index in the FIFO 14 when that condition C1 first become satisfied because this represents the start of the period of sustained high energy.

Conditions C2 and C3 permit relatively fast switching between YES_ON and YES_OFF to model short duty cycle behaviour during intervals in which the interference source is active (but only periodically creating interference on the channel in question).

Condition C4 being satisfied means the oldest recorded activity on the channel above the CCA threshold is old enough to indicate that the interference source is no longer active—"old enough" being set by the parameter τ3. In other words, C4 being satisfied indicates sustained inactivity on the channel in question which is above and beyond the intermittent inactivity on that channel which is expected even when the interference source is active, and thus a switch by the interference source to the inactive state. The condition C4 is sufficiently 'lax' do permit some inactivity to accommodate switching between State_YES_ON and State_YES_OFF without reverting to State_NO too readily. Due to the transition conditions and the fact that T4 is a transition from STATE_YES_OFF (without switching back to STATE_YES_ON), the transition can be assumed to take place at a time corresponding to the current first index.

The state transition criteria C1, ..., C4 are such that the State_NO is proposed in most relevance to the large-scale duty cycle estimation, while STATE_YES_ON and STATE_YES_OFF are most relevant to the small-scale duty cycle estimation.

More specifically, for the state machine to enter the State_YES_ON from State_NO, a certain amount of high energy detection values must have been received so as to avoid the easy trigger of sporadic high energy detection values due to multiple reasons, including a collision between an energy detection operation with a valid packet header resulting in the packet header being 'mistaken' for interference.

Further, un-balanced criteria are employed between leaving State_NO and entering State_NO, such that it takes longer to enter the State_NO. The reason is that to better distinguish between the state State_YES_OFF and State_NO. The criteria between entering the State_YES_ON and State_YES_OFF are also mode different such that they do not overlap with each other.

As will be apparent, the above values of m1, m2, M1, M2 are exemplary. In practice, appropriate values will be set in dependence on other parameters, such as the observation interval FIFO sizes etc.

The large scale duty cycle LDC is determined as:

$$LDC = \frac{\sum (t2 - t1)}{N_{index}}$$

and the small scale duty cycle SDC as:

$$SDC = \frac{\sum (t1' - t2')}{\sum (t2 - t1)}$$

where $N_{index}$ is the number of planned observed indexes i.e. the expected number of energy detections in the duration over which the t1 and t2 values are collected—for instance, if an energy detection operation is performed once every 100 ms for the duration of an hour, then $N_{index}$=36000); $N_{index}$ is used as an indication of total duration of time. The operator "Σ" denotes the summation over all the relevant times recorded as the state machine 20 changes state (e.g. Σ(t2−t1) means the most recently recorded t2 value less the most recently recorded t1 value, plus the next most recently recorded t2 value less the next most recently recorded t1 value etc.).

When multiple channels are monitored contemporaneously, multiple such state machines are implemented and updated independently of one another—one for each channel.

Returning to FIG. 1A, the modelling component 8 is shown to comprise an interference power estimation component 8a which estimates the average interference power on a wireless channel(s).

To estimate the average interference power for a given channel, a running-sum averaging operation is undertaken for the energy detection values for that channel in the states State_YES_ON and State_YES_OFF, and only taking into account the values which are larger than a measurement threshold (MT) which is a few (one or more) dBs lower than the threshold for an energy detection index to be recorded by FIFO (i.e. the CCA threshold). That is, the average interference power is estimated as $$power = \frac{SUM}{|E|}; \text{ where } SUM = \sum_E ED \in E;$$

where E={ED|ED>MT and in State_YES_ON or State_YES_OFF} i.e. the set of ED values above MT and measured when the state machine 20 is either in State_YES_ON or State_YES_OFF (not State_NO), and where |E| is the number of values in E. The running sum is maintained by, each time a new ED value (newED) above MT is detected in State_YES_OFF/State_YES_ON, updating "power" by updating "SUM" and "|E|" as:

SUM→SUM+newED;
|E|→|E|+1.

This measurement threshold MT is chosen so as to focus on the interference-introduced energy detection values rather than random noise-introduced, and due to the fact that conservative transition criteria are chosen by the state machine, resulting being at the STATE_YES_OFF or STATE_YES_ON with no instantaneous interference present i.e. certain non-relevant sporadic energy present in the channel is automatically excluded due to the state transition conditions.

The estimated average interference power is useful for taking certain strategies for transmitting/receiving data in the presence of interference. For instance, if the interference duty cycles are relatively high but the average interference power is relatively low, e.g. just above the CCA threshold, transmission power can be increased temporarily to account for this.

While it is possible to run the previous introduced interference characterization indefinitely, it is often desirable in practice to take the characterization within a fixed term, such as one hour. Hence, characterization results can be obtained on an hourly basis. Either of the following two approaches can achieve this. The first is to let the state-machine running indefinitely but record the instantaneous states at the hour boundaries and then calculate correspondingly the duty cycles and average interference power levels. The other approach is simply to reset the state machine at the starting of every hour to the STATE_NO. The bias introduced by the second approach is minimal as the nature of the computation is based on the indexed in the FIFO, and much simpler than the first approach to implement in practice.

The behaviour of the interference source might change during the (e.g.) hour. However, from application point of view, it is sufficient to get an updated interference characterization after a relatively long time, such as an hour. This is one of the aspects how this technique is different from the resource-demanding real-time channel estimation approaches discussed above.

During an ED operation, the radio transceiver cannot transmit or receive any normal packet. To ensure that critical data is not delayed or missed due to the real-time energy detection operation a schedule of energy detection operation is made.

Figure 5:
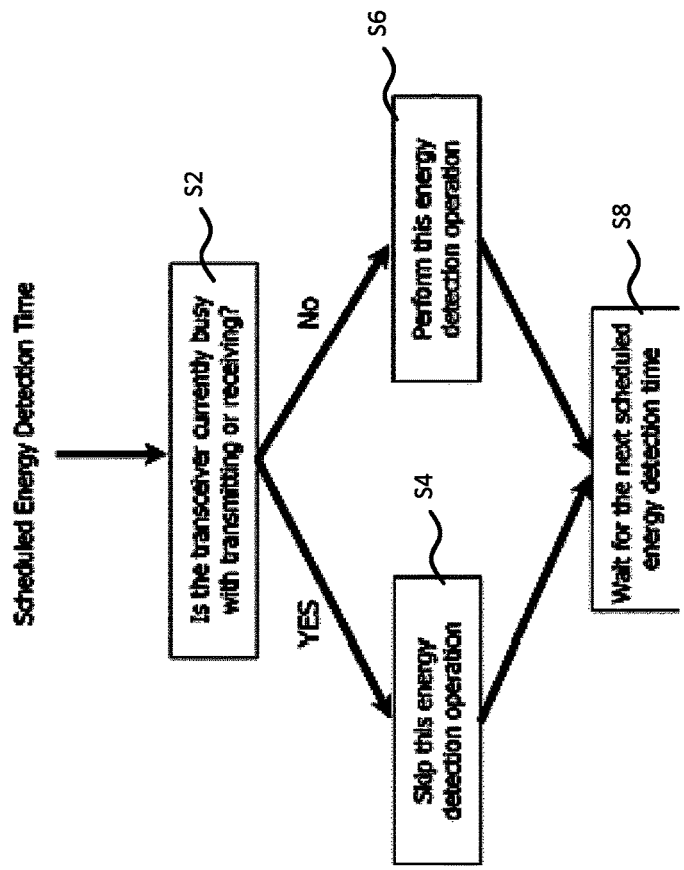
FIG. 5 shows a flow chart of a method for scheduling a sequence of energy detections.

FIG. 5 shows a flow chart for the scheduling. At the scheduled time for an energy detection operation, it is determined whether the transceiver is currently busy with transmitting or receiving a data packet (S2). If not, the transceiver is instructed to perform a short energy detection (S4); if so, this scheduled energy detection operation is simply skipped (S6). In either event, the transceiver awaits (S8) the next scheduled time to try to perform the next energy detection operation. Optionally, this scheduled operation can be randomized in execution.

When performing regular real-time energy detection operations as set out above, it does not have significant impact to skip a few energy detection operations. Hence, prioritizing data transmission over energy detection ensures that critical data is not missed whilst advantageously having minimal impact on the interference characterization method.

The inventors have performed simulations as well as field measurements based on the present subject matter. As an example, a simulation result with given interference source is presented as follows. It can be seen in the following that the estimation gives reasonable estimation accuracy given the appropriate setting of parameters.

Figure 6A:
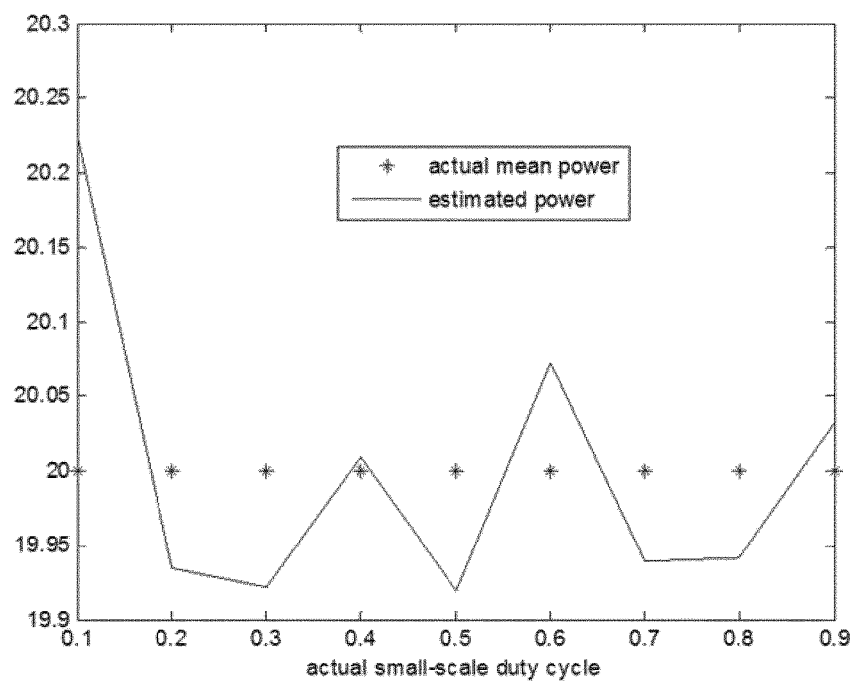
FIG. 6A shows results for a simulation of an interference power estimation technique.
Figure 6B:
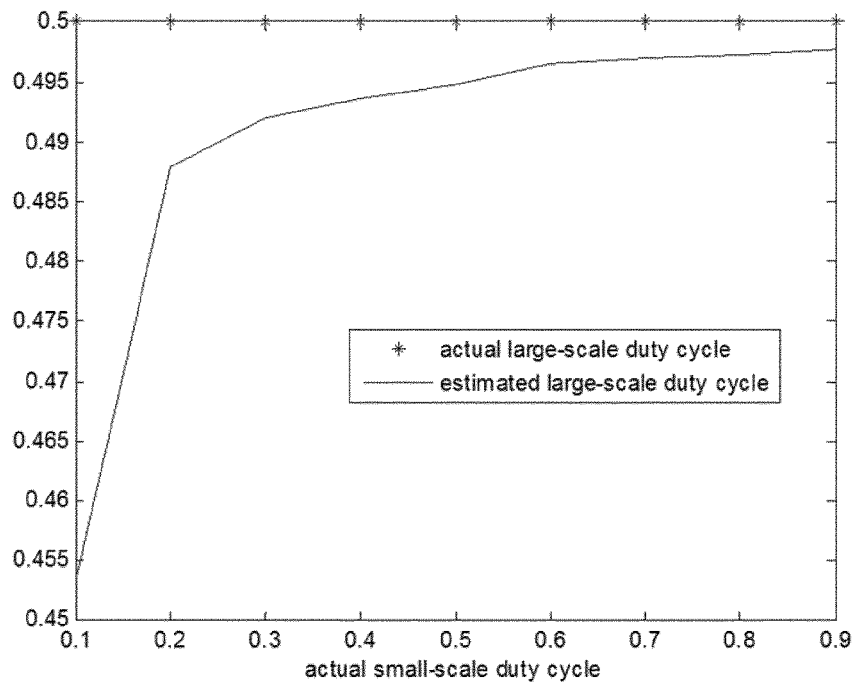
FIG. 6B shows a graph of results for a simulation of a large time scale duty cycle estimation technique.
Figure 6C:
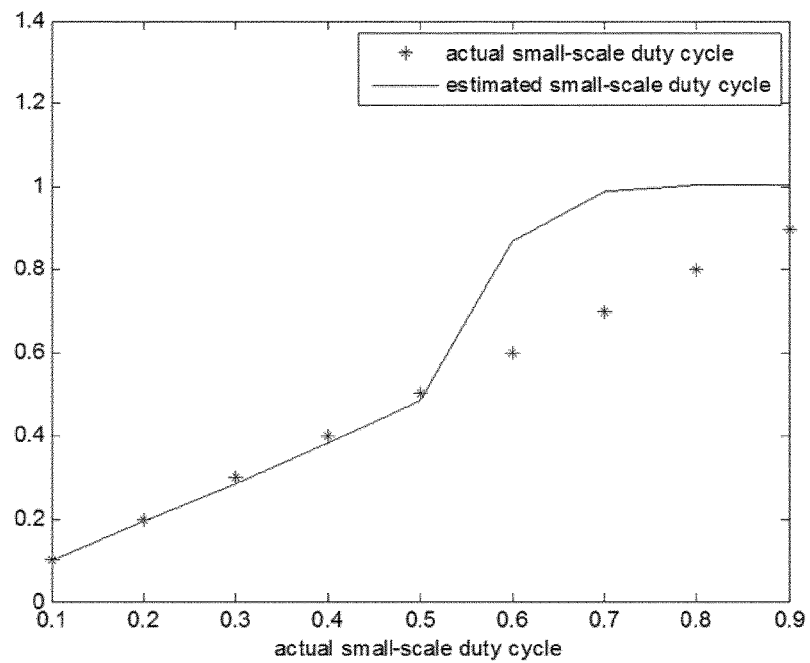
FIG. 6C shows a graph of results for a simulation of a small scale duty cycle estimation technique.

Simulation conditions:
ED sampling interval 100 ms
Interference:
 large scale period=60 s
 Large scale duty cycle=50%
 Small scale period=2 s
 Small scale duty cycle=10% to 100%
 Random interference amplitude=10 to 30
Simulation time: 1 hour FIG. 6A shows a graph of simulation results on the estimated average power as a function of actual (simulated) small scale duty cycle. FIG. 6B shows a graph of simulation results on the estimated large-scale duty cycle as a function of actual small scale duty cycle. FIG. 6C shows a graph of simulation result on the estimated small-scale duty cycle as a function of actual small scale duty cycle.

The inventors have also implemented the proposed interference characterization method onto the Phillips Starsense Wireless communication platform and undertaken real-field measurement to practical interference sources: an active RFID device with frequency hopping modulation scheme. The RFID device has multiple modes with different behaviours.

Figure 7B:
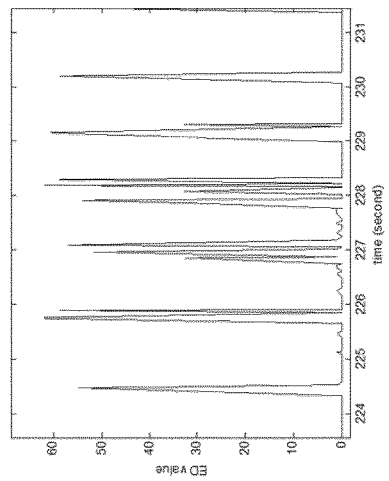
FIGS. 7A-D show graphs of sequences of energy detection measurements for an active RFID interference source operating in different modes.
Figure 7D:
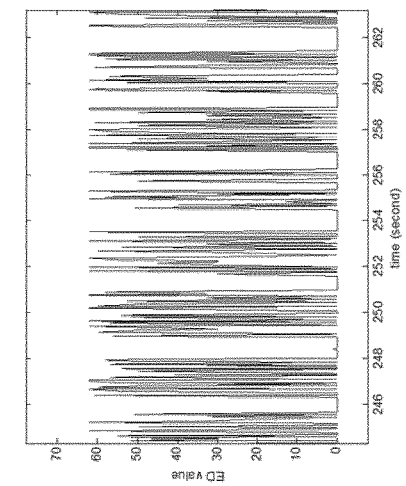
Figure 7A:
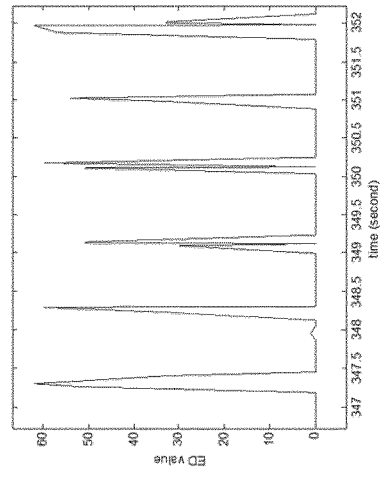
Figure 7C:
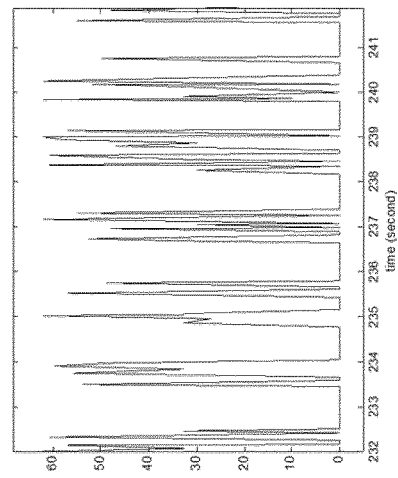

It is not practically possible to know precisely what is the real duty cycle or average power. Nevertheless, from the result presented in FIGS. 7A-D, which focus on the small-scale duty cycle estimation, it can be seen that, with proper parameter setting, it is possible to get reasonably accurate estimation results. FIG. 7A shows a graph of ED values collected over time by the transceiver when the RFID device is configured to mode 1 operation of the activeRFID device, FIG. 7B mode 2, FIG. 7C mode 3, and FIG. 7D mode 4.

TABLE 1

| mode: | T1 = 100 ms | T1 = 50 ms |
| --- | --- | --- |
| Mode 1 (FIG. 7A) | 50.2% | 12.8% |
| Mode 2 (FIG. 7B) | 62.7% | 29.4% |
| Mode 3 (FIG. 7C) | 70.3% | 47.5% |
| Mode 4 (FIG. 7D) | 81.7% | 65.7% |

The table entries are small-scale duty cycle estimations as estimated for a given mode and T1 (T1 is the interval between energy detection operations).

Figure 8:
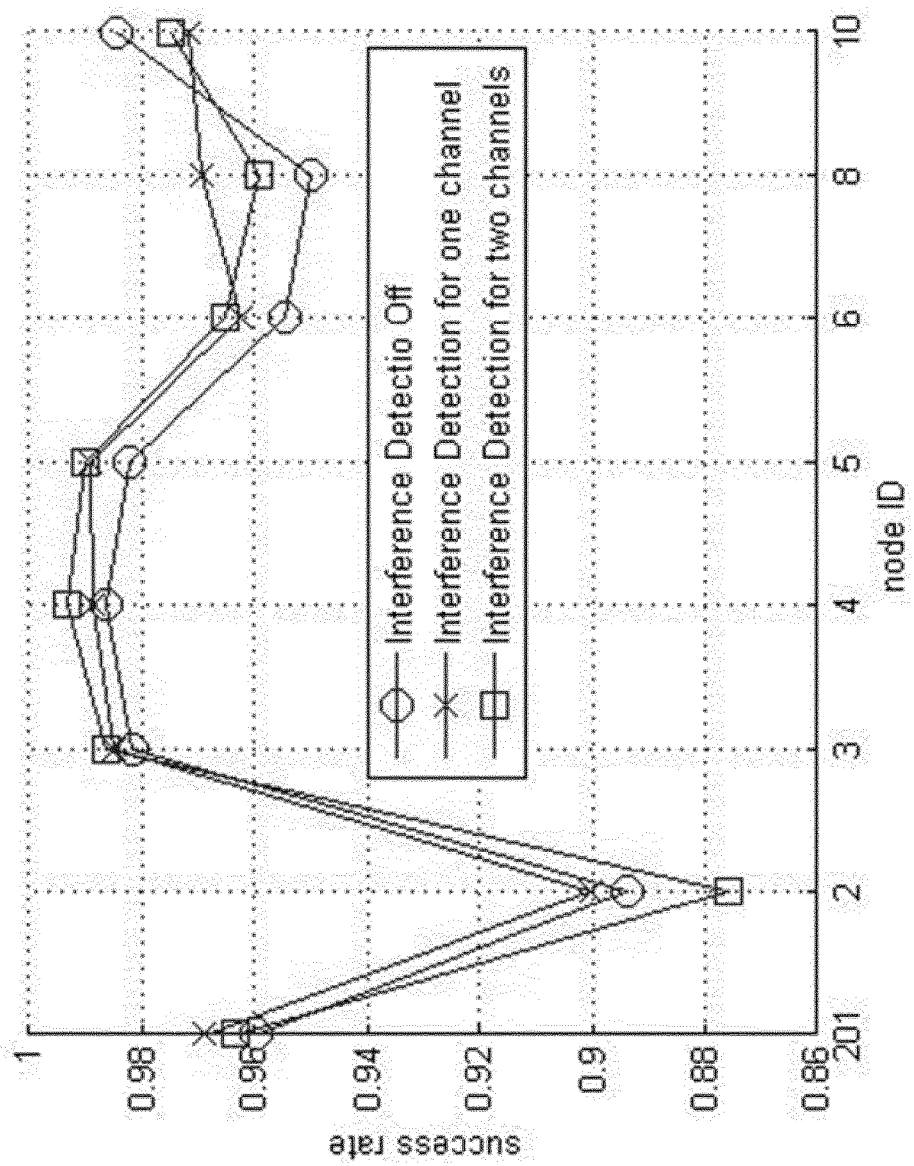
FIG. 8 shows a graph of results of a network performance simulation.

The inventors have also undertaken real field measurement to evaluate the impact of regular energy detection sampling on the network performances, to demonstrate that the normal transmit/receive operation is not significantly disrupted by the energy detection operations. The experiment was undertaken in a small-sized network with 8 nodes, with an assumed Europe setup at the 868.3 MHz channel where a 1% duty cycle limit is introduced by the regulation. The result on the network performance as measured in terms of the success rate for unicast messages (vertical axis) for each node is presented in FIG. 8. It can be seen that the impact on the network performance is negligible in this setup.

As indicated, general applications of the subject matter invention include wireless lighting control networks—for instance, Starsense Wireless and Light-on-Demand systems—and sensor network communication applications using the un-licensed band. However, the subject matter is not limited to these applications.

Whilst the above considers duty cycles, alternative short and long time scale metrics are feasible, for instance temporal metrics each comprising respective time(s) which describe the relevant transitions.

Moreover, as will be apparent, the conditions C1-C4 above which dictate the behaviour of the state machine are exemplary—other suitable conditions which can characterize dual duty cycle behaviour of an interference source will be apparent.

Whilst the above presents state machine-based duty cycle estimation, one can employ different methods to estimate the small and large scale duty cycles, e.g. digital filtering techniques with different response times or classical signal estimation techniques, based on the recorded sequence or sequences of energy detection results.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device for communicating on a wireless channel in the presence of an interference source, the device comprising:
    an interface configured to connect to a wireless transmitter and a wireless receiver;
    a controller configured to control the receiver to access the channel to perform a sequence of energy detections, each energy detection comprising collecting energy in the channel at a respective detection time; and
    a modelling component configured to model the interference source as cyclically transitioning into and out of an inactive state and as cyclically transitioning, when out of the inactive state, between a first active state, in which the interference source is active and creating interference on the channel, and a second active state, in which the interference source is active but creating a substantially lower level of interference on the channel;
    wherein the modelling component is arranged for determining based on the sequence of energy detections: i) a large time scale metric which describes the transitioning into and out of the inactive state, and ii) a small time scale metric which describes the transitioning between the first and second active states; and
    wherein the controller is configured to effect transmission of data by the transmitter in dependence on the estimated metrics.

2. A device according to claim 1 wherein the data is transmitted as packets which are categorized as delay-sensitive or delay-insensitive, and wherein delay-sensitive packets are transmitted in dependence on the small time scale metric and delay-insensitive packets are transmitted in dependence on the large time scale metric.

3. A device according to claim 2 wherein the delay-insensitive packets are transmitted in dependence on both the large time scale metric and the short time scale metric.

4. A device according to claim 1 wherein the large and small time scale metrics convey a duty cycle of the transitioning into and out of the inactive state and the duty cycle of the transitioning between the first and second active states respectively.

5. A device according to claim 1 wherein the modelling component is configured, for each energy detection in the sequence, to determine whether the energy collected at the respective detection time is above a clear channel assessment threshold and to store an index of that energy detection only if so, the metrics being determined based on the stored indexes.

6. A device according to claim 5 wherein the indexes for amounts which are above the clear channel assessment threshold are inputted to a first input first output ("FIFO") structure having a size M, whereby only the M most recent indexes above the clear channel assessment threshold are stored in the FIFO structure, the metrics being determined based on the indexes stored in the FIFO structure.

7. A device according to claim 1 wherein the modelling component is configured to implement a state machine, the state machine comprising: an inactive state corresponding to the inactive state of the interference source, a first active state corresponding to the first active state of the interference source, and a second active state corresponding to the second active state of the interference source, wherein the state machine is configured to transition between states in dependence on conditions pertaining to the plurality of energy measurements as follows:
    from the inactive state to the first active state when a first of said conditions is satisfied, satisfaction of the first condition indicating a transition by the interference source out of its inactive state,
    from the first inactive state to the second active state when a second of said conditions is satisfied, satisfaction of the second condition indicating a transition by the interference source into its second active state,
    from the second active state to the first inactive state when a third of said conditions is satisfied, satisfaction of the third condition indicating a transition by the interference source into its first active state,
    from the second active state to the inactive state when a fourth of said conditions is satisfied, satisfaction of the fourth condition indicating a transition by the interference source into its inactive state;
    wherein the metrics are estimated by tracking transitions of the state machine.

8. A device according to claim 7 wherein the first condition is that M1 index(es) in the FIFO structure are within a first window, wherein the second condition is that at most m1 index(es) in the FIFO structure are within a second window shorter than the first window, wherein the third condition is that at least m2 index(es) in FIFO are within the second window, and the fourth condition is that at most M2 index(es) in the FIFO structure are within a third window longer than the first window.

9. A device according to claim 1 comprising an interference power estimation component configured to estimate an average interference power, estimating the average interference power comprising summing a plurality of energy detection values, each obtained by an energy detection in the sequence for which a) the respective detection time coincides with the interference source being in the first or second active state and b) the amount of energy collected at the respective detection time is above a measurement threshold.

10. A device according to claim 9 wherein the measurement threshold is lower than the clear channel assessment threshold.

11. A device according to claim 1 wherein the sequence of energy detections is performed according to a periodic schedule, wherein:
    each detection is performed at its scheduled time so that the sequence is periodic; or
    each energy detection performed at a time offset from its scheduled time by an amount selected at random from a predetermined time interval so that the sequence is pseudo-periodic.

12. A device according to claim 11 wherein the channel is one of N wireless channels on which the device can communicate, and the controller is configured to control the receiver to access each of the N channels to perform a respective sequence of energy detections based on the periodic schedule, the periodic schedule having a period T, wherein the sequences are interleaved with one another in time and each of the sequences is offset in time from a respective other of said sequences by T/N, wherein the sequences are used to model interference on the N channels.

13. A device according to claim 1 which is configured for use in a wireless sensor network and/or a wireless lighting control network.

14. A method for communicating on a wireless channel in the presence of an interference source, the method comprising:

controlling a receiver to access the channel to perform a sequence of energy detections, each energy detection comprising collecting energy in the channel at a respective detection time; and modelling the interference source as cyclically transitioning into and out of an inactive state and as cyclically transitioning, when out of the inactive state, between a first active state, in which the interference source is active and creating interference on the channel, and a second active state, in which the interference source is active but creating a substantially lower level of interference on the channel;

wherein modelling the interference source comprises determining based on the sequence of energy detections: i) a large time scale metric which describes the transitioning into and out of the inactive state, and ii) a small time scale metric which describes the transitioning between the first and second active states; the method further comprising:

effecting transmission of data by a transmitter in dependence on the estimated metrics.

15. A computer program product comprising code stored on a non-transitory computer readable storage medium and configured when executed to implement the method of claim 14.

* * * * *